United States Patent [19]
Hearn

[11] Patent Number: 5,948,253
[45] Date of Patent: Sep. 7, 1999

[54] THREE LAYER HYDROCARBON FILTER

[76] Inventor: Preston Hearn, 119 26th Ave. N., St. Petersburg, Fla. 33704

[21] Appl. No.: 08/935,814

[22] Filed: Sep. 23, 1997

[51] Int. Cl.$^6$ .................................................. B01D 27/00
[52] U.S. Cl. ........................ 210/282; 210/284; 210/290; 210/489; 210/502.1
[58] Field of Search .................................. 210/691, 692, 210/693, 416.5, 502.1, 908, 263, 264, 282, 287, 290, 488, 489, 266; 264/112, 113, 122, 129

[56] References Cited

U.S. PATENT DOCUMENTS

| | | | |
|---|---|---|---|
| 2,027,876 | 1/1936 | Pennebaker | 210/131 |
| 3,948,767 | 4/1976 | Chapman . | |
| 4,265,759 | 5/1981 | Verpalen et al. | 210/261 |
| 5,011,609 | 4/1991 | Fink | 210/665 |
| 5,112,479 | 5/1992 | Srimongkolkul | 210/290 |
| 5,174,879 | 12/1992 | Gadke-Fuhrmann | 210/290 |
| 5,252,215 | 10/1993 | McFarlane et al. | 210/502.1 |
| 5,328,598 | 7/1994 | Löhrl et al. | 210/93 |
| 5,474,672 | 12/1995 | Peterson et al. | 210/85 |
| 5,622,630 | 4/1997 | Romano | 210/693 |
| 5,635,063 | 6/1997 | Rajan et al. | 210/282 |
| 5,746,914 | 5/1998 | Hanna et al. | 210/290 |

*Primary Examiner*—David A. Reifsnyder
*Attorney, Agent, or Firm*—Pettis & Van Royen, P.A.

[57] ABSTRACT

The present invention relates to a filter for removal of hydrocarbons and synthetic hydrocarbons from water by adsorption and/or absorption. The invention comprises a flow-through filter. The filter comprises at least three layers of filter media that extend radially in relation to the longitudinal axis of the filter. The first and third layers of filter media are comprised of a first material that is hydrophobic and removes hydrocarbons from contaminated water through adsorption or absorption and the second layer is comprised of a mix of the first material with a second material, a generally rigid granular spacer. The layers of filter media are separately placed within the casing, but are not spaced apart from one another.

9 Claims, 3 Drawing Sheets

THREE LAYER HYDROCARBON FILTER

BACKGROUND OF THE INVENTION

1. Field of the Invention

The present invention relates to a filter for removal of hydrocarbons and synthetic hydrocarbons from water by adsorption and/or absorption. The filter media is contained within a casing for flow through filtration of contaminated fluids.

2. Description of the Prior Art

Contamination of water by hydrocarbons, including oils and greases, is a well-known problem. Water contamination can occur by direct leakage of hydrocarbons from storage containers, or as the byproduct of a manufacturing process, or the operation of mechanical equipment. Often as cooling water circulates through a manufacturing system hydrocarbons leak into the cooling water. Air compressors generate a waste stream of condensate that collects hydrocarbon contaminants from the air compressor lubrication systems. Diesel and gasoline engines are notorious for leaking hydrocarbons during their operation. In marine environments, particularly in boats having motors, the hydrocarbons leak from the motors and mix with the water that collects within the bilges. The U.S. Environmental Protection Agency has strict standards for the disposal of water contaminated with hydrocarbons. Most of the hydrocarbons must be removed to prevent pollution of the environment.

Since the recognition of the damage that hydrocarbons do to the environment, many systems have been developed for their removal from water and other carriers. When contaminated water contains a large quantity of immiscible hydrocarbons that are lighter than water, skimming is effective as a first step in separating the hydrocarbons from water, but skimming is ineffective for removal of light contamination. After skimming is completed, the contaminated water must be treated further, as skimming Leaves too much contamination.

Sand filters have been used to remove hydrocarbons from water, but they have a number of problems. Most sand filters are too fine to permit oil to penetrate the filter resulting in rapid plugging through agglomeration of the oils with the filter media. A bed of larger granules of sand opens the filter bed for penetration of the contaminants, reducing the agglomeration but then the sand filters do not efficiently collect the contaminants.

Bed type filters using dual media are also known. These filters have a first upper layer of large granular material and a second lower layer of fine granules. The layer of the large granular media opens the top surface of the bed to permit the penetration of suspended contaminants deeper into the bed for access to the second layer of fine sand, but agglomeration still occurs reducing the efficiency of the filter bed.

U.S. Pat. No. 5,207,895 discloses a complex Oil/Water Separator that uses vertical columns of coalescing media fabricated from polypropylene. The coalescing media causes the oil to join together to float on the top of water, so that the layer of oil can be drawn off for disposal.

Various materials have been effectively used to collect hydrocarbons through absorption or adsorption. These materials are often used to contain oil spills and to clean the oil from the top of the water surface and from beaches. The material is formed into long booms and placed into the water to restrict the movement of the oils floating on the water and to trap the oils that come into contact with the boom through absorption or adsorption. The material is very effective on its surface, but the oil collects close to the surface of the boom without penetrating, preventing full utilization of the material. For cleanup purposes the material is used in relatively thin sheets. Using these materials as filter media for a flow through filter has been unacceptable due to plugging of the passageways in the first three inches or so of the filter media, and due to channeling through the media that permits the contaminated water to flow through the filter without contacting fresh media for effective reduction of the hydrocarbons carried therewith.

One method to overcome the plugging of the filter media is disclosed by the patent to Lohri et al, U.S. Pat. No. 5,328,598, which discloses a filter having three layers of an adsorption media that are divided by a pair of spaced apart plates that extend radially to the longitudinal axis of the jacket, across the filter casing sealing the filter media into three separate compartments. A plurality of narrow bores or tubules are formed through these plates for the passage of contaminated water from one filter layer to the next.

Not withstanding the existence of many prior art methods for separating hydrocarbons from water, it remains clear that there is a need for a simple flow-through filter. Such filters can be used in many locations, but are particularly suited for the marine environment where the water in the vessels bilges; is contaminated with hydrocarbons and yet the water must be removed from the vessel. The hydrocarbons must be removed from the water in the bilges so that the water meets the established standards, before the water is returned to the environment. The oil must be collected by a filter media for later disposal.

SUMMARY OF THE INVENTION

The present invention relates to a filter for removing hydrocarbons, including, but not limited to oils, synthetic oils, and greases, from a fluid. The invention comprises a flow-through filter having an exterior casing with an inlet opening at the first end of the casing and an outlet opening at the second end. The casing has a longitudinal axis and within the casing are placed at least three layers of filter media that extend radially in relation to the longitudinal axis of the casing. A first layer is placed proximal to the first end, a third layer is placed proximal to the second end and a second layer is inserted therebetween. The first and third layers of filter media are comprised of a first material that is hydrophobic, when the fluid is water, and removes oil from the contaminated fluid through adsorption or absorption and the second layer is comprised of a mix of the first material with a second material, a generally inactive granular spacer. The layers of filter media are separately placed within the casing, but are not spaced apart from one another.

The invention accordingly comprises an article of manufacture possessing the features, properties, and the relation of elements that will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings. Different embodiments utilize reference numbers increased by increments of 100 to indicate similar parts to those identified in the embodiment of FIG. 2.

DETAILED DESCRIPTION

Figure 1:
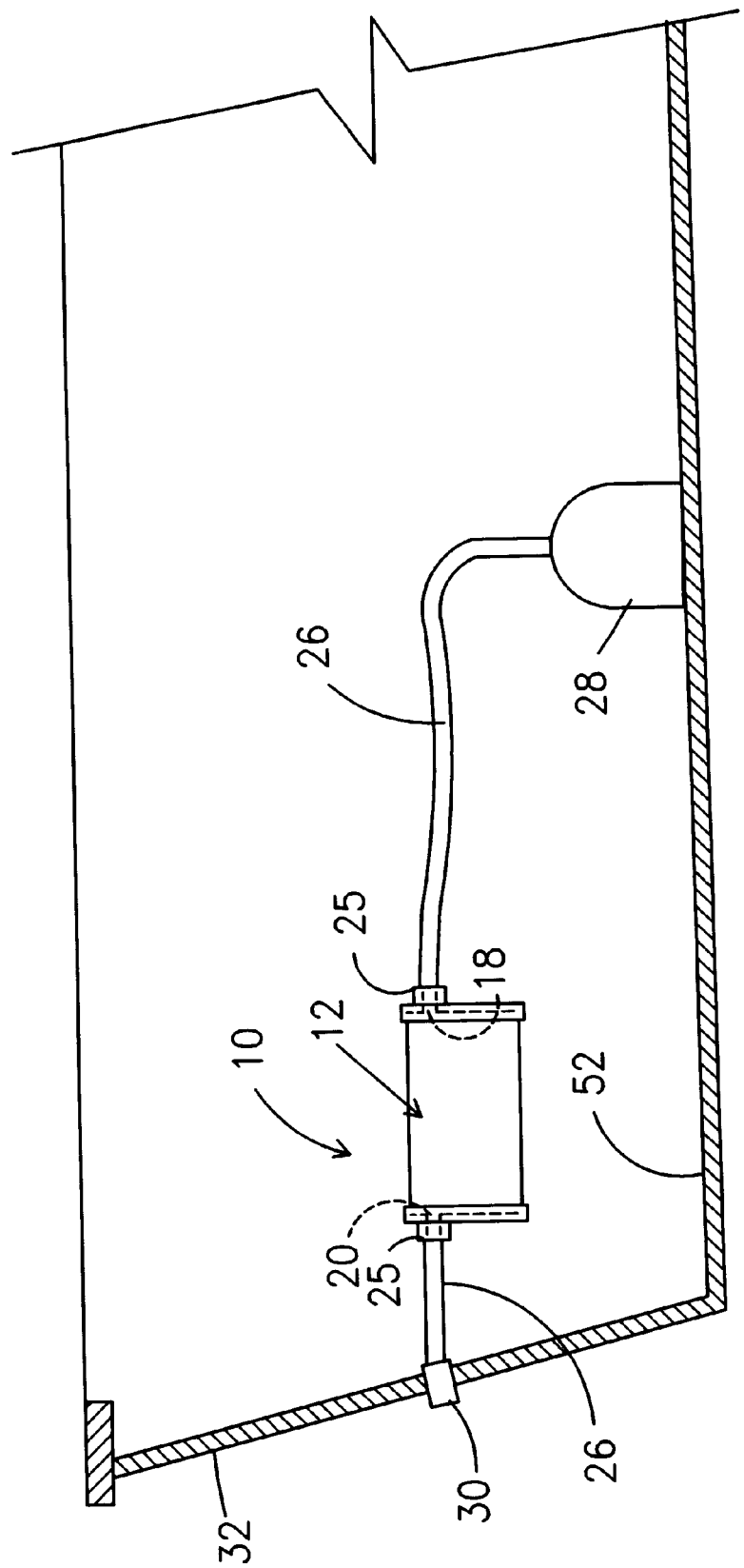
FIG. 1 is a cross sectional view of a portion of a water craft illustrating the invention connected to a sump pump and to a line discharging water to the outside of a water craft.
Figure 2:
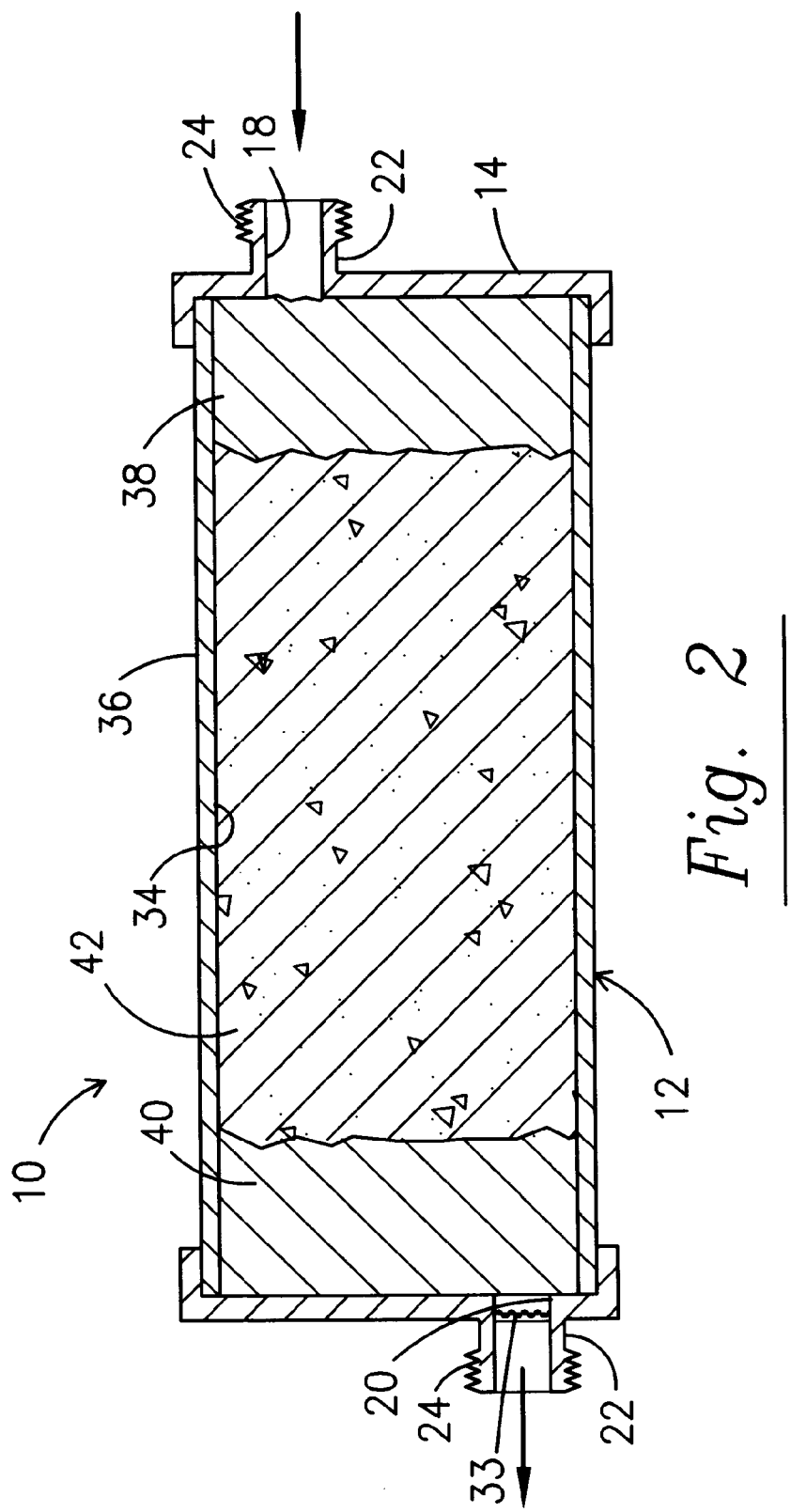
FIG. 2 is a sectional side view of the filter of this invention.
Figure 3:
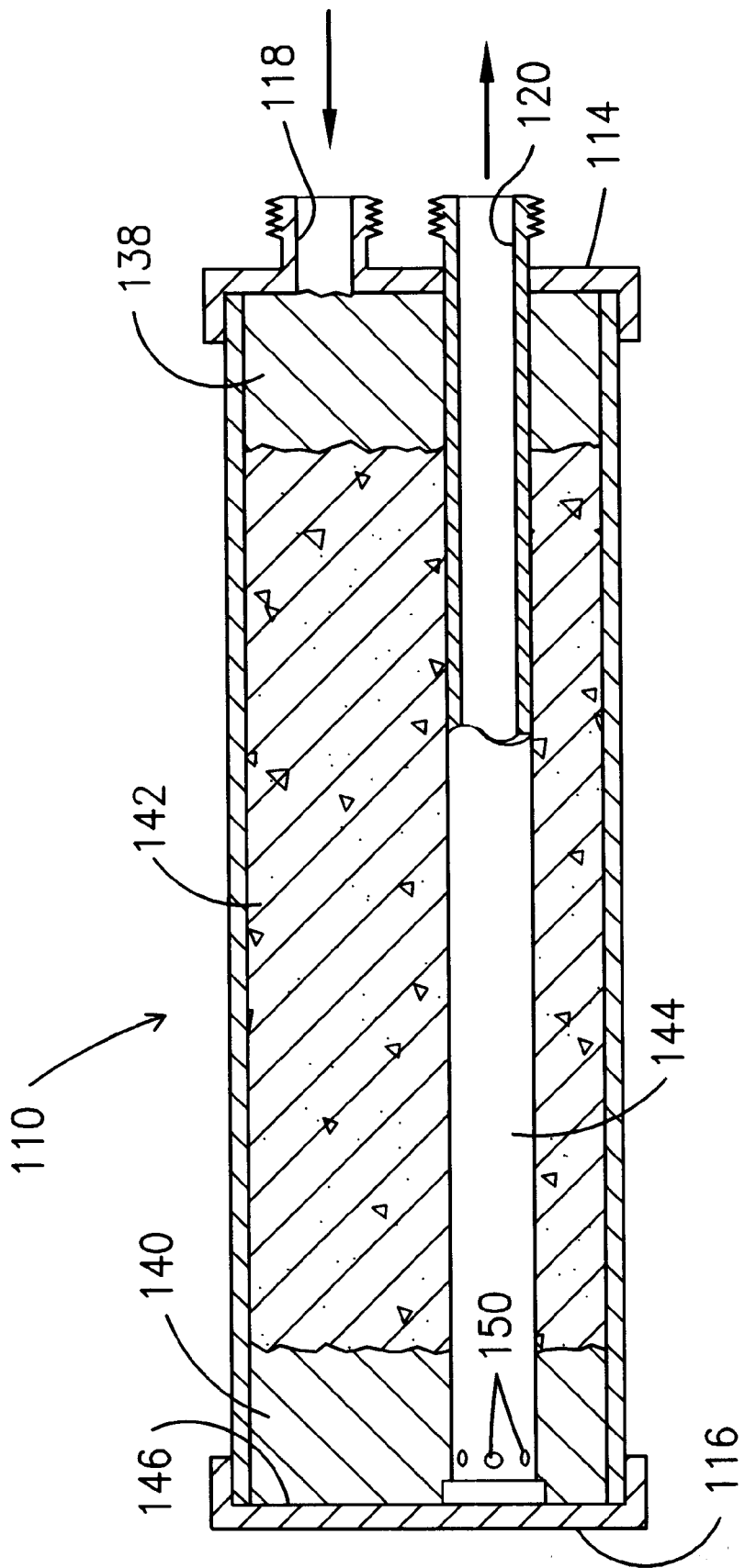
FIG. 3 is a sectional side view of a second embodiment of this invention.

Preferred embodiments of the filter of this invention are illustrated in the drawing FIGS. 1–3. The filter is generally indicated as 10 in the views of FIG. 1 and 2, and as 110 in FIG. 3. In FIG. 2 it can be seen that the filter 10 of this invention comprises a generally cylindrical casing 12 having a first end 14 and a second end 16. The first end 14 has an inlet opening 18 therethrough and the second end 16 has an outlet opening 20 therethrough. In this embodiment, the casing 12 has a circular cross section and the ends 16 and 18 are in the form of caps that are glued in place during manufacture of the filter 10. The casing 12 is made of a translucent polypropylene so that the level of hydrocarbons collected by the filter can be viewed. In other embodiments, the casing 12 may be of various shapes and constructed from other suitable materials including, but not limited to, synthetic resins. A short pipe 22, having threads 24 formed thereon, is attached to each end 14 and 16 in fluid flow relation to the respective inlet opening 18 and outlet opening 20. As seen in FIG. 1, the threaded pipes 22 are for ease of connection to female fittings 25 on hoses 26 that extend between the inlet opening 18 of the filter 10 and the output end of a sump pump 28, and between the outlet opening 20 of the filter 10 and a fitting 30 that extends through the side of a water craft 32. A screen 33 is installed within the opening 20 to prevent the media from being carried out of the filter 10.

Three layers of filter media are inserted within the longitudinally extending casing 12 so that the layers extend radially outwardly to the interior surface 34 of the side wall 36, as shown in FIG. 2. The first layer 38 of filter media lies adjacent to the first end 14, the third layer lies adjacent to the second end 16, and the second layer 42 lies therebetween. The first and third layers 38 and 40 of filter media are comprised from a first material. The first material must be hydrophobic and must be capable of adsorbing or absorbing hydrocarbons and synthetic hydrocarbons. In a preferred embodiment, the first material is shredded polypropylene that is compacted into a mat. It is preferred that the thickness of the fibers of polypropylene lie in the range of 20 to 53 microns or a mesh equivalent of 625 to 275. A characteristic of polypropylene material is that it will hold hydrocarbons, such as oil and grease, and synthetic hydrocarbons, such as synthetic oils, by adsorption on the polypropylene fiber surfaces. By shredding the polypropylene a greater surface area becomes available for holding the hydrocarbons. The shredded polypropylene produced by Minnesota Mining and Manufacturing, Co. as type 210, is one material that is suitable for use as the first material for the filter 10 of this invention, and will be used as the example throughout the application. Shredded polypropylene produced by other manufacturers, that lie within the size ranges noted above, will also be suitable for this purpose. There are a number of other products that will meet the criteria for the first material and could be substituted for the shredded polypropylene and provide satisfactory results. For example, SAFE HARBOR™ A.C.T. is also a material that removes hydrocarbons from water and would be suitable for use as the first material. This product is an aminoplast resin that is made in flexible flakes of open and closed cells of interconnecting capillaries. The product is made by Cover Foam Services, Inc.

The second layer 42 of filter medium, is comprised of a generally uniform mixture of the first material and a second material, a spacing material. In a preferred embodiment, the second material, is comprised of ground polypropylene, an inexpensive waste product from a number of manufacturing processes. The polypropylene is ground to a particulate that is approximately 0.6 inches long, by 0.2 inches wide, by 0.2 inches thick. The filter will remain effective if the particulate length of the second material lies in the range of 0.125 to 0.75 inches, the width lies in the range of 0.125 inches to 0.75 inches and the thickness lies in the range of 0.125 to 0.75 inches. Most any other particulate material that is generally inert and generally rigid can be used as a substitute for polypropylene. The particles must be generally rigid so that the particles are not compressed under pressure and they maintain their general shape and size. It is acceptable if the second material adsorbs or absorbs hydrocarbons to some degree, as done by the first material. Ground polypropylene is a preferred embodiment for the second material and will be referred to as the second material throughout the application.

The thickness of each layer of filter media will depend somewhat upon the size and shape of the filter 10. For example in a preferred embodiment, when constructing a filter 10 that is three (3) inches in diameter and ten (10) inches long, and using the 3M® type 210 material, the first layer 38 and the third layer 40 will each contain 24 grams of material compressed into a mat that is 1 and ½ inch thick. In other embodiments, the thickness of the first layer 38 and the third layer 40 may lie in the range of 0.75 inches to 2 inches, and include a proportional amount of material by weight for that thickness. Embodiments whose first 38 and third 40 layers lie in this range will still provide an effective filter 10.

Of particular importance is the proportion of the first material and the second material in the second layer 42 of the filter medium. In one preferred embodiment, using the example of the 3 inch by 10 inch filter, the second layer 42 of filter medium will then be seven (7) inches thick and contain 60 grams of 3M® type 210 material and 227 grams of ground polypropylene. In other embodiments the second layer 42 should have a minimum thickness greater than two (2) inches, and contain proportional amounts of material by weight as in the seven inch layer. The maximum thickness of this layer is controlled primarily by the total size of the filter. In other embodiments, the proportion by weight of the ground polypropylene to the shredded polypropylene can be as little as 2:1 or as much as 8:1 and the filter 10 will still operate, but it will not be as effective and efficient as the preferred embodiment of the filter 10 in which the ratio is approximately 4:1 (227 grams/60 grams).

The difference in the filter 110 is its structural configuration as the configuration of layers of media illustrated in filter 10 may be used in the filter 110. The filter 110 is a flow through filter, but the inlet opening 118 and the outlet opening 120 extend through the same end 114. To provide a means for removal of fluid from the third layer 140 of the media, a tube 144 is inserted in the filter 10 so that a closed first end 148, is adjacent to the interior surface 146 of the end 116 and a second end, defined as the outlet end 120, extends outwardly through the go first end 114 of the filter 10. For efficiency, the first end 148 of the tube 144 should be as close as possible to the interior surface 146. A plurality of holes 150 are bored through the tube 144 to receive the water after having been pushed through the layers of media 138, 142 and 140 of filter 110 by the sump pump 28, as shown in FIG. 1. The water then exits through the outlet opening 120.

Having thus set forth a preferred construction for the filter 10 of this invention, it is to be remembered that this is but a preferred embodiment, Attention is now invited to a description of the use of the filter 10. The filter 10 and 110 of this invention may be used to remove hydrocarbons from many fluids. Of particular interest is removal of hydrocarbons from water but the discussion of this use will be just an illustration of one of the many uses of the filter 10 and 110. One configuration for the installation of a filter 10 is illustrated in FIG. 1. A sump pump 28, capable of producing 2 psi gauge pressure, is placed in the bilge 52 of a boat 32 for pumping the water that has collected in the bilge 52 of the boat 32. The contaminated water will be pumped through the filter 10 and out from the boat 32 through the fitting 30. This preferred embodiment is a once through system, however piping may be added for circulating the water through the filter 10 as often as desired. The filter 10 will be able to handle pump pressures as high as 30 psi gauge. Pumps with pressures higher than 30 psi gauge will have to have their pressures reduced through a regulator inserted in the hose 26 between the sump pump 28 and the filter 10. Boats, particularly those with inboard engines, collect in their bilges all the oils, grease, fuels and other hydrocarbons or synthetic hydrocarbons that has leaked from equipment or has been spilled. The bilge water must be cleaned before pumping into a body of water. The filter 10 is inserted in the line 26 for removal of the hydrocarbons to a level within established standards. The pump 28 pushes the contaminated water through the inlet end 18 and into the first layer 38 of media where the hydrocarbons immediately begin collecting on the surface of the shredded polypropylene fibers and are held there by adsorption. Resistance to the pressure of the pump 28 increases as the hydrocarbons begin to constrict the pathways through the layer of media 38. As the layer of media 38 is 1 ½ inches thick in a preferred embodiment, the resistance to the flow of contaminated water is not enough to prevent the contaminated water from entering the second layer 42 of filter media. In the second layer 42, the pathways through the medium are more open due to the particles of ground polypropylene being interspersed though out this layer. Some of the hydrocarbons are adsorbed by the shredded and the ground polypropylene, but the contaminated water moves quickly through the second layer 42 of media and flows into the third layer 40 of media. In the third layer 40 of media, the hydrocarbons are adsorbed by the shredded polypropylene shrinking the pathways and building back pressure so that the contaminated fluid is held for a longer contact time in the second layer 42 of media so that the medium in the second layer 42 becomes fully saturated at the same time that the medium of the third layer 40 becomes fully saturated. When the translucent sides 36 of the filter 10 appear fully dark the filter is fully saturated and must be replaced.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not a limiting sense.

It is also to be understood that the following claims are intended to cover all of the generic and specific features of the invention herein described, and all statement of the scope of the invention which, as a matter of language, might be said to fall therebetween.

Now that the invention has been described,

What is claimed:

1. Apparatus for removal of hydrocarbons from a fluid comprising:

a longitudinally extending casing having a longitudinal axis, at least one side, and a first end and a second end, said side having an interior surface;

an inlet opening through said casing;

an outlet opening through said casing;

at least three layers of media, a first layer, a second layer and a third layer being inserted within said casing so that each said layer extends radially outwardly and engages said interior side of said casing, said first layer lying adjacent said first end of said casing, said third layer lying adjacent said second end of said casing and said second layer inserted therebetween, said first layer and said third layer being comprised of a first material that is hydrophobic and adsorbs hydrocarbons, said second layer being comprised of a generally uniformly distributed mixture of said first material and a second material comprising a generally rigid particulate.

2. An apparatus as in claim 1 wherein said first layer and said third layer is equal to or greater than three quarters of an inch thick and less than or equal to 2 inches thick.

3. An apparatus as in claim 1 wherein said second layer is equal to or greater than two inches thick.

4. An apparatus as in claim 1 wherein said first material comprises shredded polypropylene.

5. An apparatus as in claim 1 wherein said first material comprises shredded polypropylene having fibers with a thickness in the range of 20 microns to 53 microns.

6. An apparatus as in claim 1 wherein said second material comprises polypropylene particles.

7. An apparatus as in claim 1 wherein said second material comprises polypropylene particles having a length, width and depth that each lie in the range of 0.125 inches to 0.75 inches.

8. An apparatus as in claim 1 wherein in said second layer the ratio by weight of said second material to said first material is in the range of 2:1 to 8:1.

9. An apparatus as in claim 1 further comprising: a hollow tube having a first closed end and a second open end, defining said outlet opening, said first end lying adjacent said second end of said casing, said second end of said tube extending through said first end of said casing, said first end of said tube having a plurality of holes therethrough in fluid flow communication with said outlet opening.

* * * * *